United States Patent
Miles et al.

(10) Patent No.: US 7,498,564 B2
(45) Date of Patent: *Mar. 3, 2009

(54) RESONANT SCANNING NEAR-FIELD OPTICAL MICROSCOPE

(75) Inventors: Mervyn John Miles, Bristol (GB); Andrew David Laver Humphris, Bath (GB); Jamie Kayne Hobbs, Bristol (GB)

(73) Assignee: University of Bristol of Senate House, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,203

(22) Filed: Aug. 6, 2003

(65) Prior Publication Data

US 2004/0232321 A1 Nov. 25, 2004

Related U.S. Application Data

(63) Continuation-in-part of application No. PCT/GB02/00512, filed on Feb. 6, 2002.

(30) Foreign Application Priority Data

| Feb. 6, 2001 | (GB) | ................................. 0102953.7 |
| Oct. 17, 2001 | (GB) | ................................. 0124948.1 |
| Aug. 7, 2002 | (GB) | ................................. 0218320.0 |

(51) Int. Cl.
*H01J 3/14* (2006.01)
*G01N 23/00* (2006.01)

(52) U.S. Cl. ..................... 250/234; 250/306
(58) Field of Classification Search ................ 250/234, 250/216, 235, 306–311; 73/105
See application file for complete search history.

(56) References Cited

U.S. PATENT DOCUMENTS

| 3,702,398 A | * | 11/1972 | Van-Essen et al. | .......... 250/310 |
| 5,254,854 A | * | 10/1993 | Betzig | ........................ 250/234 |
| 5,412,980 A | * | 5/1995 | Elings et al. | .................. 73/105 |

(Continued)

FOREIGN PATENT DOCUMENTS

DE 19531466 10/1996

(Continued)

OTHER PUBLICATIONS

M. Antognozzi, H. Haschke and M.J. Miles, A New Method To Measure The Oscillation Of A Cylindrical Cantilever: "The Laser Reflection Detection System," Apr. 2000, Review of Scientific Instruments, vol. 71, No. 4, pp. 1689-1694.

(Continued)

*Primary Examiner*—Georgia Y Epps
*Assistant Examiner*—Pascal M Bui-Pho
(74) *Attorney, Agent, or Firm*—Volpe and Koenig, P.C.

(57) ABSTRACT

A scanning near-field optical microscope detects the evanescent field formed about an illuminated sample 14 via an interaction between the field and a local probe 20. The probe 20 is scanned across the sample surface in order to collect a complete image as a succession of scan lines. In the microscope of this invention, image collection is more rapidly performed by translating the probe 20 whilst it is oscillated at or near its resonance frequency. In this way a series of scan lines covering an area of the sample surface are rapidly collected, the length of each scan line being determined by oscillation amplitude.

18 Claims, 8 Drawing Sheets

U.S. PATENT DOCUMENTS

| | | | |
|---|---|---|---|
| 5,436,448 A * | 7/1995 | Hosaka et al. | 250/306 |
| 5,566,159 A * | 10/1996 | Shapira | 369/124.02 |
| 5,742,172 A | 4/1998 | Yasutake | 324/754 |
| 6,008,489 A | 12/1999 | Elings et al. | 250/234 |
| 6,094,971 A * | 8/2000 | Edwards et al. | 73/105 |
| 6,172,506 B1 | 1/2001 | Adderton et al. | 324/458 |
| 6,220,084 B1 | 4/2001 | Chen et al. | 73/105 |
| 6,236,783 B1 * | 5/2001 | Mononobe et al. | 385/43 |
| 6,404,207 B1 | 6/2002 | Bhushan | 324/671 |
| 6,489,611 B1 * | 12/2002 | Aumond et al. | 250/306 |
| 6,504,365 B2 * | 1/2003 | Kitamura | 324/244 |
| 6,614,227 B2 | 9/2003 | Ookubo | 324/316 |
| 6,752,008 B1 | 6/2004 | Kley | 73/105 |
| 2002/0043101 A1 * | 4/2002 | Naitou et al. | 73/105 |
| 2002/0097046 A1 | 7/2002 | Kitamura | 324/244 |
| 2004/0182140 A1 * | 9/2004 | Weide et al. | 73/105 |

FOREIGN PATENT DOCUMENTS

| | | |
|---|---|---|
| DE | 19852833 | 5/2000 |
| EP | 0410131 | 1/1991 |
| EP | 0551814 | 7/1993 |
| EP | 0864899 | 9/1998 |
| EP | 545538 A1 | 9/2003 |
| JP | 8129018 | 5/1996 |
| JP | 2000199736 | 7/2000 |
| JP | 20014519 | 1/2001 |

OTHER PUBLICATIONS

S.K. Sekatskii, G.T. Shubeita and G. Dietler, Time-Gated Scanning Near-Field Optical Microscopy, Oct. 2, 2000, Applied Physics Letters, vol. 77, No. 14, pp. 2089-2091.

S.H. Simpson, S. Hanna, Analysis Of The Effect Arising From The Near-Field Optical Microscopy Of Homogeneous Dielectric Slabs, Sep. 1, 2001, Optics Communications 196, pp. 17-31.

Khaled Karrai, Robert D. Grober, Peizoelectric tip-sample control for near field optical microscopes, Apr. 3, 1995, American Institute of Physics, vol. 66, No. 14, pp. 1842-1844.

Claire E. Jordan, Sephen J. Stranick, Removing optical artifacts in near-field scanning optical microscopy by using a three-dimensional scanning mode, Sep. 1, 1999, Journal of Applied Physics, vol. 86, No. 5, pp. 2785-2789.

Oshikane et al., Scanning Near-Field Optical Microscope With A Small Spherical Protrusion Probe Excited With WGM Resonances, Optical Memory & Neural Networks, 2000, vol. 9, No. 3, pp. 147-168.

Oshikane et al., 3D-FDTD and experimental analysis of a resonant microcavity probe for high-resolution SNOM, Physics Devices & Information Processing, Jul. 1999, vol. 3791, pp. 57-62.

Tran et al., "Zeptofarad (10-21F) Resolution Capacitance Sensor for Scanning Capacitance Microscopy," American Institute of Physics, Jun. 2001, vol. 72, No. 6, pp. 2618-2623.

* cited by examiner

RESONANT SCANNING NEAR-FIELD OPTICAL MICROSCOPE

CROSS REFERENCE TO RELATED APPLICATION

This application is a continuation-in-part of International Application No. PCT/GB02/00512, filed Feb. 6, 2002.

FIELD OF INVENTION

This invention relates to the field of near-field microscopy, that is to microscopes that form an image by detection of non-radiating electromagnetic fields.

BACKGROUND

For centuries spatial resolution by optical microscopy was believed to be fundamentally limited by diffraction This limit followed from a classical model: gratings with a spacing of less than $\lambda/2$ (where $\lambda$ is the wavelength of the illuminating radiation) will, regardless of the angle of incidence, simply be incapable of scattering light towards a microscope objective. Thus any structural features within an object having a spatial variation smaller than $\lambda/2$, will be lost from an image formed by conventional microscopy.

With the development of scanning tunnelling microscopy (STM), resolution was achieved for the first time below the diffraction limit and the family of local probe based microscopes was born. The scanning near-field optical microscope (SNOM, sometimes referred to as NSOM) is a local probe device which detects photons, rather than the electrons of STM.

Models developing the theory of SNOM operation are based on a distinction between radiating (or propagating) and non-radiating (or non-propagating or evanescent) electromagnetic fields. The radiating field is that which is detected by conventional optics (even as close as a distance of a few wavelengths from the sample), that is the field which propagates away from a sample, and which is incapable of communicating sub-wavelength information. The evanescent field is localised at a sample surface and its existence can be deduced from a consideration of the boundary conditions at the interface of a nanometric structure and an illuminating field. This non-radiating field is characterised by high spatial frequencies which reflect surface structure and which are unable to propagate away. In the near-field zone (which term is used herein to refer to the region within which the evanescent field exists around an illuminated sample) both propagating and non-propagating components exist. These are not separable and a perturbation of one will lead to a modification of the other. It was shown by E. Waif and M. Nieto-Vesperinas in "Analycity of the angular spectrum amplitude of scattered fields and some of its consequences", J. Opt. Soc. Am. Vol. 2, pages 886-889 (1985) that a light beam impinging, on a limited object (where limited in this sense means that the material structure presents a sharp discontinuity) will always be converted into a propagating and an evanescent field. The incident field can be either propagating or evanescent.

The object behind all local probe-based microscopes is to detect an evanescent field formed about a sample via the interaction between the field and a probe (hence local probe). There are a variety of ways in which this has been realised. A review of this field is presented in the paper "Image Formation in Near-Field Optics" by Jean-Jacques Greffet and Remi Carminati in Progress in Surface Science, Vol. 56 (3), pages 133-237 (1997). Examples of local probe SNOM techniques include apertured and apertureless methods, which are each sub-divided into collection and illumination modes. Regardless of data collection technique, a full image of the sample surface is formed by scanning the probe and taking successive data readings.

Upon its development SNOM found many applications. In addition to its obvious relevance to imaging surfaces at a nanometer scale, SNOM has also proven useful in the detection and measurement of confined electromagnetic fields such as surface plasmron polaritons, guided waves and microcavity resonant modes, for local spectroscopy of surfaces; for the modification of surface properties, e.g. nanowriting or modification of magneto-optic domains. This latter application offers great potential for significant advances in high-density data storage.

In apertured SNOM, the most commonly used technique, an aperture with dimensions of tens of nanometers is held within a few nanometers of the surface to be studied. This aperture is usually the end of a sharpened optical fibre, the side surfaces of which are coated in aluminium (to form an opaque "screen" with central aperture). In illumination mode a laser is shone down the optical fibre. As the aperture is sub-wavelength an electromagnetic field cannot propagate and an evanescent field, which decays rapidly with distance, is formed about the probe tip. The evanescent field is scattered and diffracted by the surface under study and this field perturbation is coupled into the propagating field. The propagating waves are then detected in the far field. In collection mode the sample is illuminated in a standard manner, for example by an optical microscope objective, and the apertured probe is again brought to within the near field range of the surface. In this implementation the probe interacts directly with the evanescent and propagating fields present in the near-field zone. The evanescent field itself cannot propagate along the probe, but its interaction with the probe results in the generation of a propagating component which is re-emitted into, for example, an optical fibre light guide In apertureless SNOM neither detection nor illumination are in the near field. Both are in the far field and the probe is a small scattering tip which is brought into the near field. The probe interacts with the evanescent field generated about the illuminated sample and the results of this interaction are seen in propagating waves collected in the far field. By scanning the probe close to the sample surface therefore, variations in the near field are transferred to the far field. Vertical dithering of the probe and lock-in detection are used in practical instrumentation in order to discriminate signal from background.

Regardless of the detail of the implementation, a key practicality of all local probe microscopes is to find some way of controlling the tip-surface separation in order to ensure that the probe is held within the decay length of the evanescent field either of two methods are commonly employed to achieve this: the "shear force" and photon scanning tunnelling microscopy (PSTM) techniques.

The shear force method involves oscillating horizontally, with respect to the sample surface plane, a vertically-mounted probe, at a frequency close to its resonant frequency. Such an oscillation may be effected by a piezoelectric element vibrating the tip laterally over a few nanometers. As the surface is approached surface-probe interactions lead to a damping of the oscillation amplitude. The damping mechanism under ambient conditions, is generally thought to be due to a confined water layer on the sample surface, but other damping interactions are also feasible. Oscillation amplitude can then be measured, for example, by photovoltaic measurement of an oscillating shadow of the tip in a secondary light beam. By monitoring this amplitude it is possible to maintain it at a constant value and therefore to maintain constant distance between the tip and the sample surface.

The PSTM technique involves monitoring the photon current (by analogy with the electron current in STM) to maintain probe-sample separation. In STM, by adjusting height so as to maintain a constant electron current, the probe can be kept a set distance away from the sample surface. Monitoring the photon current however is far less straightforward. Both evanescent and radiating fields are present in the near field and the detected photon current is not only dependent on the topography of the sample, but also on its material nature and the, distance of analysis. Despite this, photon current can be used effectively in certain specialised circumstances. One such example is when the sample is illuminated by total internal reflection of an incident beam and probed in transmission. In this arrangement illumination is by evanescent field only and so there will be minimal propagating wave on the probe side of the sample. This increases the photon current dependence on topography, and makes monitoring the photon current to maintain separation viable. This mode of SNOM, operating with the combination of illumination by total internal reflection and height control via the photon current, will be referred to herein as PSTM.

A disadvantage of all local probe techniques is data collection time: a full image scan taken with the necessarily small probe is time consuming. Typically, the time taken to collect an image is in the region of several tens of seconds, which precludes real-time monitoring of many scientifically, industrially and physiologically important processes. Furthermore, as local probe techniques are increasingly being used to read and write data beyond the $\lambda/2$ limitation of conventional optical storage media, it is rapidly becoming apparent that the speed of data processing is limited by the speed with which information can be read. There is therefore a perceived need to improve data collection times in near-field scanning techniques.

SUMMARY

It is an object of this invention to provide a system capable of more rapid collection of near-field interactions and thereby to increase information readout rates and to open up more scientific, industrial and physiological processes to real-time SNOM investigation.

Accordingly the present invention provides a scanning near-field optical microscope comprising a probe which is moveable into a near-field region surrounding a surface of an illuminated sample; driving means arranged to provide relative motion between the probe and the sample surface; means for oscillating the probe across the sample surface; and a detector arranged to detect electromagnetic radiation affected by an interaction between probe, field and sample in the near-field region; characterised in that, the microscope is arranged, in operation, to carry out a scan of the sample surface wherein scan area is covered by an arrangement of scan lines, each scan line being collected by oscillating the probe at or near its resonant frequency such that oscillation amplitude determines scan line length and their arrangement is provided by operation of the driving means.

In near- or at-resonant oscillation the probe will move very rapidly over the sample surface. Each scan line is collected as a continuous (analogue) image as the probe oscillates across the surface of the sample. By simultaneously providing relative motion between the probe and sample surface, successive scan lines will collect information from different parts of the surface. After covering an area of the surface, scan line information can be collected and reconstituted with appropriate displacements to form an image of the two-dimensional scan area.

Various orientations of probe oscillation and probe/surface relative motion may be used to cover the scan area. A linear translation may be applied in a direction which is substantially orthogonal to a plane in which the probe is oscillated, thereby defining a substantially rectangular scan area. If the relative motion is continuous, the scan area is rapidly covered by a single, continuous, zigzagging line. Alternatively, a circular arrangement may be generated by providing a relative rotation of probe and sample about an axis substantially coincident with that about which the probe is oscillated. Moreover, oscillation may also follow a figure of eight path, again with a rotational relative motion.

It is very much preferred that the relative motion between probe and sample surface is provided at an adjustable separation distance, this distance during the scan being controlled by height-adjustment means arranged to monitor a parameter characteristic of probe-surface distance and to adjust either probe or sample height in order to maintain a substantially constant value of that parameter.

As previously mentioned, in order to take a meaningful local probe measurement, the probe itself must be kept within a few nm of the sample surface. Under even the best practically achievable conditions, instabilities in the equipment and environment make it very difficult to control the height of the probe to this extreme degree of consistency without incorporating some degree of independent adjustability. Accordingly, the preferred local probe microscope will scan the probe at an adjustable height above the sample surface.

Preferably the driving means is also arranged to provide the physical height adjustment, either by driving the probe or the sample.

The distance between'the probe and surface may be controlled by feedback from the value of the monitored parameter. Advantageously, this monitored parameter which is characteristic of probe-surface distance is oscillation amplitude, and data relating to this parameter is gathered contemporaneously with scan line image collection. This measurement is the basis for the so-called shear force method of estimating probe-surface distance. As is well known and frequently exploited in this field, probe oscillations will become more damped as the surface is approached and the strength of the shear force between the moving probe and surface is increased. This means that a measure of probe height may be obtained by monitoring oscillation amplitude In prior art systems relying on shear force the image-gathering scan is stepped in two dimensions and at each stopping-point the probe is oscillated to provide data for the height adjustment. Although this does enable probe height to be maintained and so improve image resolution there are a number of disadvantages. First, the scan must be stepped in two dimensions. This inevitably increases the complexity of equipment needed to carry out the scan and the number of pauses between steps naturally adds to the time required to complete the scan. Secondly, if scan speed is important in the prior art arrangement, then amplitude information may be gathered at the same time as image collection. However, the oscillations of the probe over each pixel will inevitably lead to a slight loss, of resolution. For this reason oscillation amplitudes are kept as small as possible, typically ~few nm.

By way of contrast, by making a two-fold use of the oscillation of the probe the arrangement of the apparatus is considerably simplified. Probe oscillation is used in this embodiment of the invention to provide both an entire scan line and a height indication. There is therefore no need to provide driving equipment capable of providing stepped motion in multiple dimensions in order to cover a scan area. Moreover, by extending the amplitude of oscillation, the signal is read continuously along each scan line: there is no loss in resolution due to either digitisation or probe oscillation. Inevitably, there is the loss of the ability to integrate signals obtained at discrete scan points which will lead to some loss of accuracy. This is not to say that integration cannot be performed with the apparatus of this invention, it can of course be achieved but at the expense of speed. For example multiple probe oscillations may be carried out while collecting information on what is effectively the same scan line. For many applications it has been found that the slight overall loss in resolution is more than compensated by the gain in the speed at which an image can be collected.

The means for oscillating the probe across the sample surface is preferably arranged, during scan line collection, to oscillate the probe just off its resonant frequency. Although oscillation at resonance would maximise the length of a scan line, oscillation near resonance provides the advantage of increased sensitivity when relying on the shear force to provide an indication of probe-surface separation. The shear force method requires oscillation amplitude to be measured and there is a greater response, by way of amplitude change, to a shift in position of the resonance peak when operating just off resonance.

The microscope may also include a laser source, split photodetector and split detector signal processing means arranged such that light from the laser is incident on and reflected from the probe, when oscillating towards the split detector. The processing means is then arranged to generate a value for probe-oscillation amplitude based on a ratio of signals received at different parts of the split detector.

This provides an advantageous means by which the probe oscillation amplitudes can be measured. Other methods exist but those relying on interferometry, although being very accurate, have more critical requirements in beam alignment and also tend to be prone to mechanical drift. This embodiment of the invention therefore provides a relatively simple apparatus with which to take the necessary amplitude measurements, with acceptable accuracy. It also provides an absolute measurement of probe displacement which in turn defines the scan size.

Alternatively the probe may be attached to a prong of a tuning fork and probe oscillation amplitude measured by means of a piezoresistive coating on the prongs. This technique, as described by K. Karrai & R. D. Grober in "Piezoelectric tip-sample distance control for near field optical microscopes", Appl. Phys. Lett. 66(14), 1842-1844 (1995), has the advantage that it is somewhat simpler to set up than the alternatives.

Optionally, if the electromagnetic field is substantially an evanescent field then the parameter characteristic of probe-surface distance may be photon current. Preferably this arrangement is applied using a photon scanning tunnelling microscope. In theory, it will also be applicable to apertured illumination methods but, to date, there has been no practical implementation of height control by monitoring the photon current generated in apertured illumination. In this embodiment of the invention the probe oscillation is used only for traversing a scan line, and the signal intensity is integrated over one oscillation cycle. This provides an alternative means of maintaining, probe height which does not require the additional equipment used to measure oscillation amplitude. As photon current is actually already measured in collecting an image, the only additional requirement will be further data processing.

In another aspect the present invention provides a photon scanning tunnelling microscope comprising: a prism for supporting a sample on its top surface; guiding optics for directing light from an associated light source into the prism and to internal incidence on its top surface at an angle sufficient to provide for total internal reflection and thereby to provide for illumination of the sample in an evanescent field; an exit path for removing reflected light from the prism; driving means arranged to provide relative motion between the sample and a probe; and means for oscillating the probe across the sample surface. The microscope is arranged, in operation, to hold the probe within the evanescent field surrounding the illuminated sample and to scan the probe across the sample surface such that scan area is covered by an arrangement of scan lines, each scan line being collected by oscillating the probe at or near its resonant frequency such that oscillation amplitude determines scan line length and their arrangement is provided by operation of the driving means. The microscope further comprises: detection means arranged to detect electromagnetic radiation affected by an interaction between probe, field and sample and to provide an output signal indicative of this interaction; processing means for processing and analysing the signal output from the detection means and for providing a display illustrative thereof; and signal averaging means arranged to average the signal output from the detection means and to pass the averaged signal to the driving means, the driving means being further arranged to be responsive to fluctuations in the averaged signal and to adjust, as the probe is scanned, probe-sample separation in order to maintain a substantially constant value of the averaged signal and hence of average detected photocurrent.

In a third aspect this invention provides a digital data readout system comprising a microscope as hereinabove described adapted to scan a data storage medium onto which data is written as a change in optical properties of the storage medium. Data may be written as burnt nanometric pits.

In a fourth aspect this invention provides a local probe for use in near-field microscopy arranged such that the probe is scannable over a scan area characterised in that, in covering the scan area, the probe is oscillated across a surface of a sample at or near its resonant frequency, thereby defining a series of scan lines whose length is determined by oscillation amplitude, whilst in relative motion with the surface.

In a further aspect this invention provides a method, of rapidly collecting image data from a scan area of a sample with nanometric features wherein the method comprises the steps of:—

(a) illuminating the sample with an electromagnetic field;

(b) moving a probe with tip of sub-wavelength dimensions into a near field region in the proximity of the sample;

(c) oscillating the probe across a surface of the sample at or near its resonant frequency whilst providing a relative motion between the probe and surface such that an arrangement of scan lines, whose length corresponds to oscillation amplitude covers the scan area;

(d) detecting radiation which is coupled into the near-field region, and which therefore contains information relating to interactions between the probe field and sample, at a detector; and (e) processing signals from the detector in order to extract information relating to the nanometric structure of the sample.

BRIEF DESCRIPTION OF THE DRAWINGS

Embodiments of the invention will now be described by way of example only and with reference to the accompanying drawings.

FIG. 8a shows a topographic image of the surface of a spherulite of PHB/V taken using a prior art shear-force SNOM technique.

FIG. 8b shows an optical image of the PHB/V surface taken using the same technique and at the same time as that shown in FIG. 8a.

FIG. 8c shows an image, corresponding to a portion of the image illustrated in FIG. 8b, taken using the apparatus of FIG. 7 operated in accordance with this invention.

DETAILED DESCRIPTION OF THE PREFERRED EMBODIMENT(S)

Figure 8:
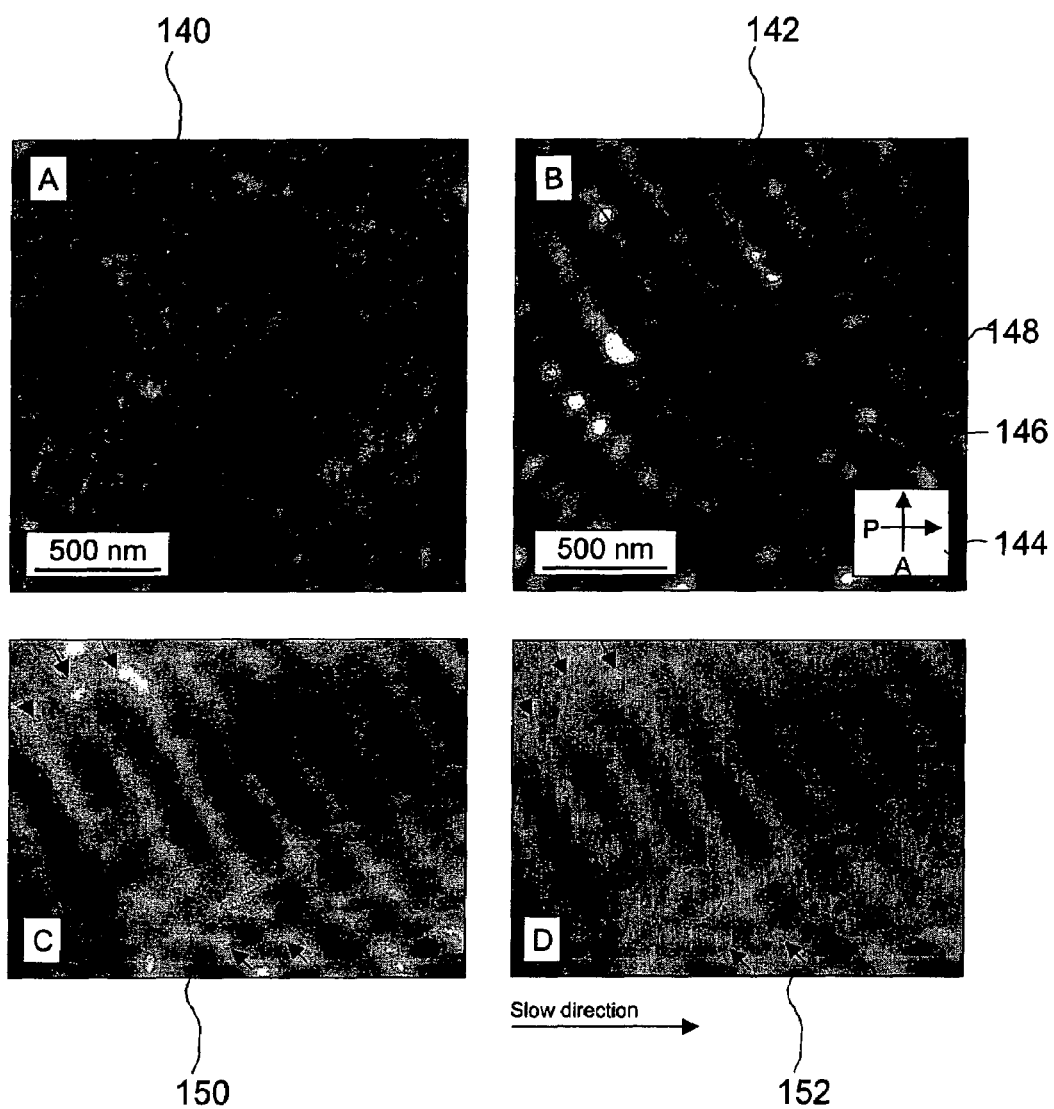

FIG. 8d shows an image corresponding to that shown in FIG. 8c, but with the data collected still more rapidly.

Figure 1:
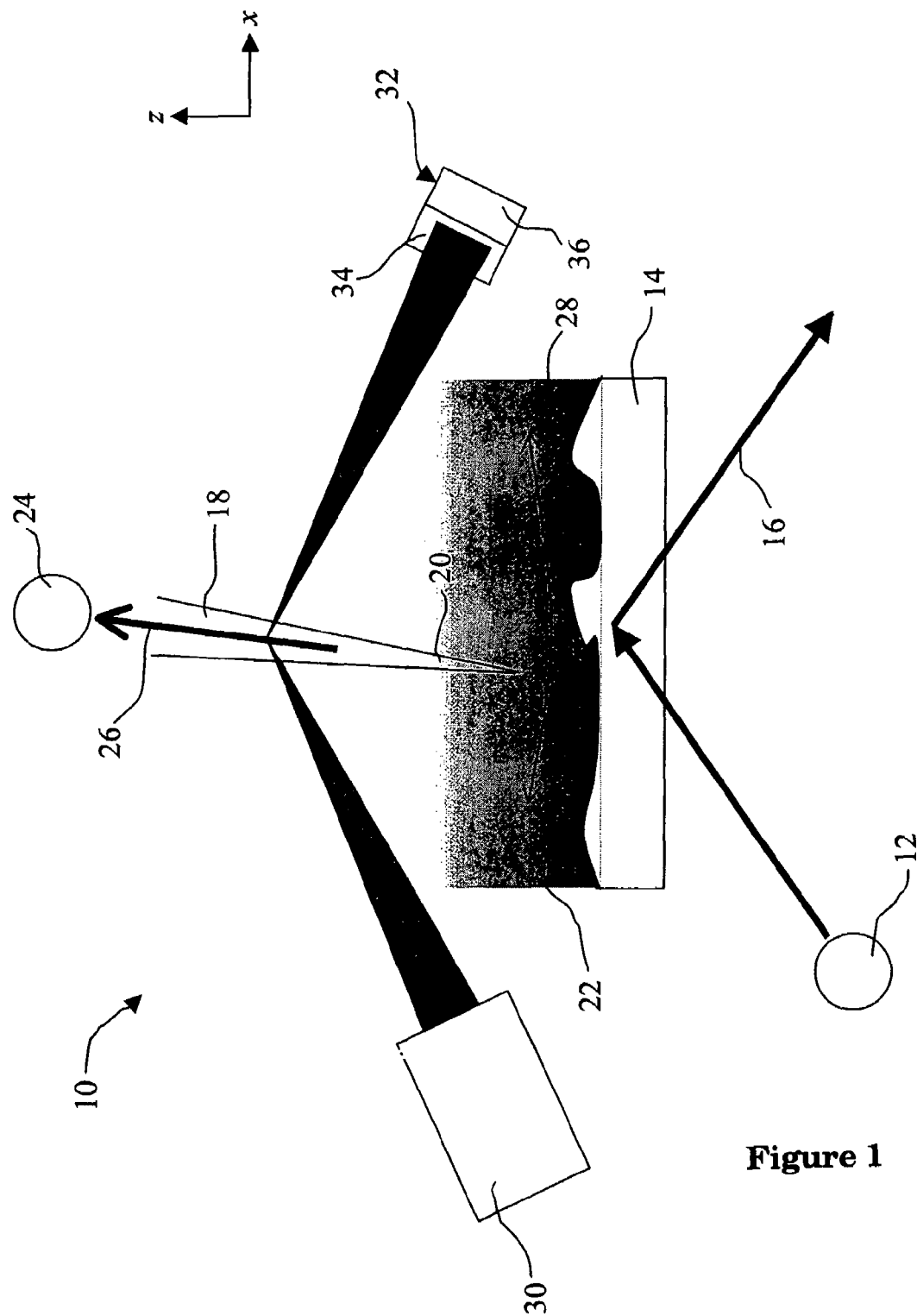
FIG. 1 shows a schematic implementation of the invention in a SNOM mode in which illumination is by total internal reflection.

FIG. 1 illustrates a first mode of implementation of the invention, indicated generally by 10. Light from a first laser source 12 is focused onto a Dove prism (not shown) supporting a sample 14. At the prism-sample interface the light undergoes total internal reflection, reflecting propagating waves 16 and illuminating the sample 14 in an evanescent field. A tapered optical fibre 18 with probe tip 20 is mounted substantially normally to the sample surface and is moveable into the near-field region 22. A photodiode detector 24 is arranged to collect an optical signal 26 propagating along the fibre 18. A piezoelectric transducer (not shown) is connected to the fibre 18 in order to drive a near-resonance oscillation of the probe tip 20 in a lateral direction, as indicated by arrows 28. The prism supporting the sample 14 is mounted on a scan tube (not shown) which controls its motion in a plane perpendicular to the oscillation plane, containing the oscillation axis. Probe oscillation is monitored by reflection by the fibre 18 of a focused light beam from a second laser 30 towards an off-axis split photodiode detector 32. The split detector 32 comprises first 34 and second 36 photodetector components.

The tapered fibre 18 can be produced by a number of conventional means, for example using a Sutter carbon dioxide laser fibre puller. The lasers 12, 30 can be any of a number of types, depending on the application. In initial experiments the first laser 12 was a 20 mW He—Ne laser and the second 30 was a diode laser of around 1 mW power. For spectroscopic analysis the first laser 12 should be polychromatic, or a variety of different wavelength lasers are required.

In order to appreciate the operation of this invention it is helpful to define, for the purposes of this description only, x y and z orthogonal axes of the system. The y direction is that into the page of FIG. 1, z corresponds to the vertical direction and x the horizontal direction in the plane of the Figure. The sample thus occupies substantially the xy plane, oscillation of the fibre results in tip movement substantially in the x direction (with the oscillation axis running parallel to the z axis) and the scan tube controls sample motion in the y and z directions.

With reference to FIG. 1, the operation of the invention in this mode 10 of operation in which illumination is by total internal reflection will now be described. The first laser 12, as described above, illuminates the sample 14 in an evanescent field. In order to scan nanometric features of the sample 14, the probe tip 20 is brought into this evanescent field and oscillated in the xz plane near resonance with a relatively large amplitude of up to a few microns. At the same time the scan tube moves the prism continuously in the y direction. In this way, due to relative motion of probe 20 and sample 14, the probe performs a zigzag raster scan of the sample surface. Scan area therefore corresponds to oscillation amplitude (width) by total scan tube displacement (length). The probe is oscillated near resonance in order to obtain near-maximum scan width for a given drive force. As a result of the sample-field-probe tip interaction, a radiating field 26 is produced which propagates along the fibre to the detector 24. The detector signal is extracted and processed to derive an image of the sample surface in accordance with techniques standard in the art.

The image extracted by this method is of the optical surface. That is, it is a convolution of the optical and topographic features of the near surface region. Processing can be carried out according to the information required. For example in order to extract the optical information, the scan is repeated multiple times at different heights above the surface. The topographical contribution will be more pronounced for the lower layers and the variation over the layered images allows it to be removed. Optical information however is not ideally collected using this embodiment of this invention, as this SNOM implementation is far more sensitive to topography than other techniques. On the other hand this arrangement of apparatus, relying on total internal reflection for illumination, has several advantages over other modes of SNOM. Polarisation of the illuminating beam can be controlled and sample immersion-in an evanescent field means that stray light is strongly limited. This implementation of the SNOM technique is highly sensitive to the topography of the sample, which in turn leads to higher resolution.

A description of how to separate optical and topographical contributions to the SNOM image is found in an article by C. E. Jordan et al. "Removing optical artefacts in near-field scanning optical microscopy by using a three-dimensional scanning mode", J. Appl. Phys. 86(3) p 2785 (1999).

In order to maintain the height of the probe 20 above the sample 14 the embodiment of the invention shown in FIG. 1 makes use of the shear force method. That is, probe oscillations are monitored and adjustments made to ensure that their amplitude remains relatively constant throughout the scan. In this way a two-fold use is made of the probe oscillations: first, they contribute to execution by the probe 20 of a fast raster scan of the sample surface and secondly, they allow the crucial factor of probe height above the sample surface to be maintained.

Clearly therefore it is important to be able to measure the amplitude of probe oscillation. In order to do this, light from the second (~1 mW) laser 30 is focused to a focal point on a surface of the fibre 18. From here it is reflected at an angle of approximately 90° towards the split photodiode detector 32. As the fibre 18 oscillates the focal point is moved relative to the (curved) surface of the fibre. This changing curvature causes the angle of reflection to change and so the reflected beam moves across the split detector 32. The detector 32 is not symmetrically oriented with respect to the oscillation but detects only part, up to a half, of the swing. As the reflected beam traverses the detector 32, each photodetector component 34, 36 generates a signal, and the ratio of the two signal magnitudes is indicative of amplitude of the fibre oscillation. This response is calibrated by displacing the fibre 18 a known amount by applying a d.c. voltage to the piezoelectric transducer and observing the change in photodetector signal. This technique, of laser deflection detection, is described more fully by M. Antognozzi et al. in Rev. Sci. Instr. 71(4). p 1689-1694 (2000).

When the probe 20 is brought into the near-field zone, the desired oscillation amplitude is set as a fraction of the free (far from the surface) oscillation amplitude of the probe 20. When this set amplitude is reached the scan is started. If at any point in the scan a reduced oscillation amplitude is observed, this indicates increased damping from which it is concluded that the probe-surface separation has been reduced. The sample 14 must therefore be moved away from the probe tip 20 (in the z direction). Conversely a larger amplitude oscillation indicates an increase in probe-surface separation and the sample 14 should be raised. A feedback technique is therefore used to maintain the set oscillation amplitude and so to ensure that the average probe-surface separation over a scan line is kept approximately constant. In reality, the amplitude will vary around the set amplitude. This variation has a number of contributory factors: overshoot in height adjustment the fact that the time constant of the feedback loop has to be greater than the period of oscillation of the probe and the finite length of time it takes the probe to adjust to a change in interaction (settle time).

It is also important that the time constant for the feedback loop, which must be longer than the period of the probe oscillation, and the response time of the probe must be shorter than the time taken to complete the entire scan. Otherwise the probe would not have time to adjust if there is much change in probe-sample separation This laser-probe-split photodiode system is by no means the only way in which probe oscillation amplitudes can be measured. Numerous other techniques may also be used with this invention. One method is to illuminate the oscillating fibre 18 and observe its shadow. As the shadow traverses a split photodetector, the ratio of signals from each component will again provide an indication of oscillation amplitude. Another method is to attach the fibre to one prong of a tuning fork. As the tuning fork is excited, the prongs will flex. The flexure is measured by a piezoresistive coating on the prongs. Commonly the inside and outside of the prongs are coated and the difference in generated voltage measured. Further alternatives may be based on differential interferometry. A disadvantage of differential interferometric methods however is that they require tin beams to impinge upon the probe and retrace their paths. This has proven very difficult to align. A second disadvantage is that this system does not provide an absolute measurement of probe displacement, that is it provides only an indication of whether oscillation amplitude has risen or fallen and, finally, it is particularly prone to mechanical drift.

The probe 20 is oscillated near to resonance, rather than at resonance which would maximise the length of a scan line, because there is a greater response, by way of amplitude change, to a shift in position of the resonance peak when just off resonance. Since this change in amplitude is what is measured in order to provide an indication of any variation in the probe-sample interaction, this positioning effectively improves the signal to noise ratio.

In order to maximise speed of the scan each scan line is collected in a single oscillation of the probe. Clearly a better image could be obtained by multiple oscillations on each line although stepping and stopping the scan tube in order to provide for multiple traverses of the same line would lead to the probe ringing. This would also, clearly, reduce scan speed. The speed of the scan tube, however, can be set to move the sample at a speed as low as around 1 Å per oscillation cycle. With this speed it is possible therefore to perform something close to integration by adding consecutive lines together so that each line in the processed image becomes the average of, say, five oscillation lines. The increase in signal to noise ratio gained by this "integration" may, in many circumstances, more than compensate for the loss in resolution.

Although this embodiment of the invention includes a scan tube which provides a linear motion in the y direction, clearly many other scan geometries can be used. The only requirement, when imaging an area, is that the combination of sample (or, equivalently probe) translation and probe oscillation covers the area to be imaged. Thus, the sample could be rotated while the probe is oscillated thereby making up a scan comprising a circular series of scan lines passing through a central point. Alternatively, the probe could be set to oscillate in two perpendicular directions. If oscillations are then driven in both directions together a non-linear oscillation, such as a figure of eight, will result. If the axis of the figure of eight oscillation was then made to rotate, the probe movement would cover the scan area in a series of figures of eight passing through a central point.

Clearly if the scan is required to cover a sample area which is greater in the x direction than is covered by the oscillation amplitude of the probe, then a secondary scan in this direction may be introduced. After each step in the x direction an area of the sample is scanned, the individual scanned areas being arranged such that they cover the required sample area to be imaged.

In prior art systems relying on shear force to maintain the probe-sample distance, the scan is stepped in two dimensions and at each stopping point the probe is oscillated as it collects image data. The image collected at each point is therefore an average over the oscillation amplitude leading to a loss in resolution. By way of contrast, the oscillations of the present invention permit an analogue line scan and so resolution is not limited by digitisation. One attempt to overcome the loss of resolution inherent in the step-and-oscillate prior art systems has been to collect optical data only on the part of the swing of a shear force probe when the probe is closest to the sample surface (S. K. Sekatskii et al. Appl. Phys. Lett. 77(4), 2089-2091 (2000)). Nevertheless, this still remains an inherently time-consuming method of collecting a near-field image.

In this embodiment of the invention, the output signal from the photodiode 24 is fed through an amplifier (not shown) to a processing system (not shown) for data collection, processing and display. In order to enable digital data processing the scan line may be pixellated artificially by the processing system.

Figure 2A:
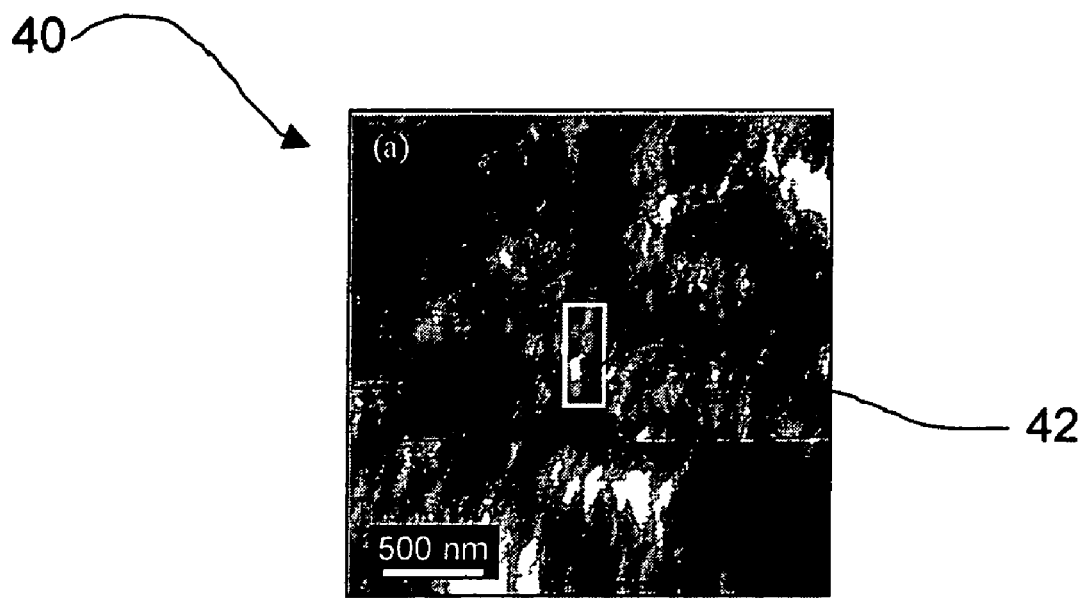
FIG. 2a shows an image of the surface of a spherulite of PHB/V taken using a prior art shear-force SNOM.
Figure 2B:
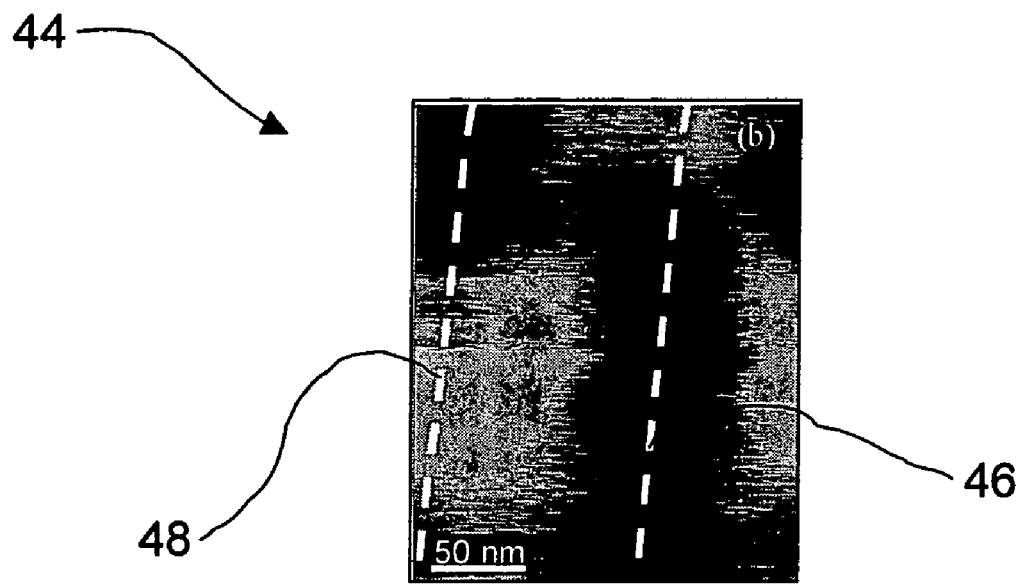
FIG. 2b shows an image, corresponding to a portion of the image illustrated in FIG. 2a, taken using the apparatus of FIG. 1.

FIG. 2*a* shows a conventionally scanned shear-force topographic image 40 of a polymer spherulite of polyhydroxybutyrate-co-valerate (PHB/V) taken using a prior art SNOM system. FIG. 2b shows an image 44 taken using the high-speed PSTM of FIG. 1, the signal processing being carried out using a LabView™ system. This image 44 is of a part of the same polymer spherulite sample, indicated by boxed region 42 in the image 40 of FIG. 2a. The LabView™ system provides a convenient way in which to process extracted image information in a laboratory prototype environment. It is envisaged that more sophisticated data processing systems will be capable of producing improved images Each scan line in the image is collected in one period of oscillation of the probe 20. Thus the image 44 has a line 46 of mirror symmetry one side being taken in a first trace and the other in a re-trace part of the oscillation. The digitisation is done in the time domain; that is, each pixel of the image is equally spaced in time from its neighbours. Since the speed of the probe varies during the swing, the image 44 is distorted with the sides and centre being somewhat 'stretched'. This distortion may be removed by applying the function:

$$x = \text{Amplitude} \times \sin\left(n \times \frac{\omega}{s}\right)$$

where x is the position of the repositioned pixel in the scan line, Amplitude is the oscillation amplitude, n is the pixel number triggered from zero displacement of the probe, s is the number of pixels sampled per second and ω is the angular velocity of the probe 20.

In taking this image 44, the resonant frequency of the probe was ~4 KHz and the oscillation amplitude 150 nm. Thus the 4000 scan lines in the image 44 were collected in about 1 second. This is nearly 2000 times faster than the time taken to record the image 40 of FIG. 2a. The resolution obtained in the high-speed image is about 30 nm. This is not a fundamental limit, but various factors contribute such as size of the probe, probe-sample separation, decay length of the field and equipment constraints. The equipment used in the prototype PSTM arrangement could readily be upgraded to improve resolution. For example, the bandwidth of the photodiode amplifier and the digitisation frequency of the particular LabView™ system available were significant contributing factors. It is envisaged that with currently-available equipment upgrades a resolution of the order of 1 nm will be readily achievable. This is comparable with the current level of resolution available using the slower, prior art-PSTM imagers (~1-3 nm)

If required, a number of images similar to but displaced from image 44 may be taken to reproduce the entire image area 40 shown in FIG. 2a.

Figure 3:
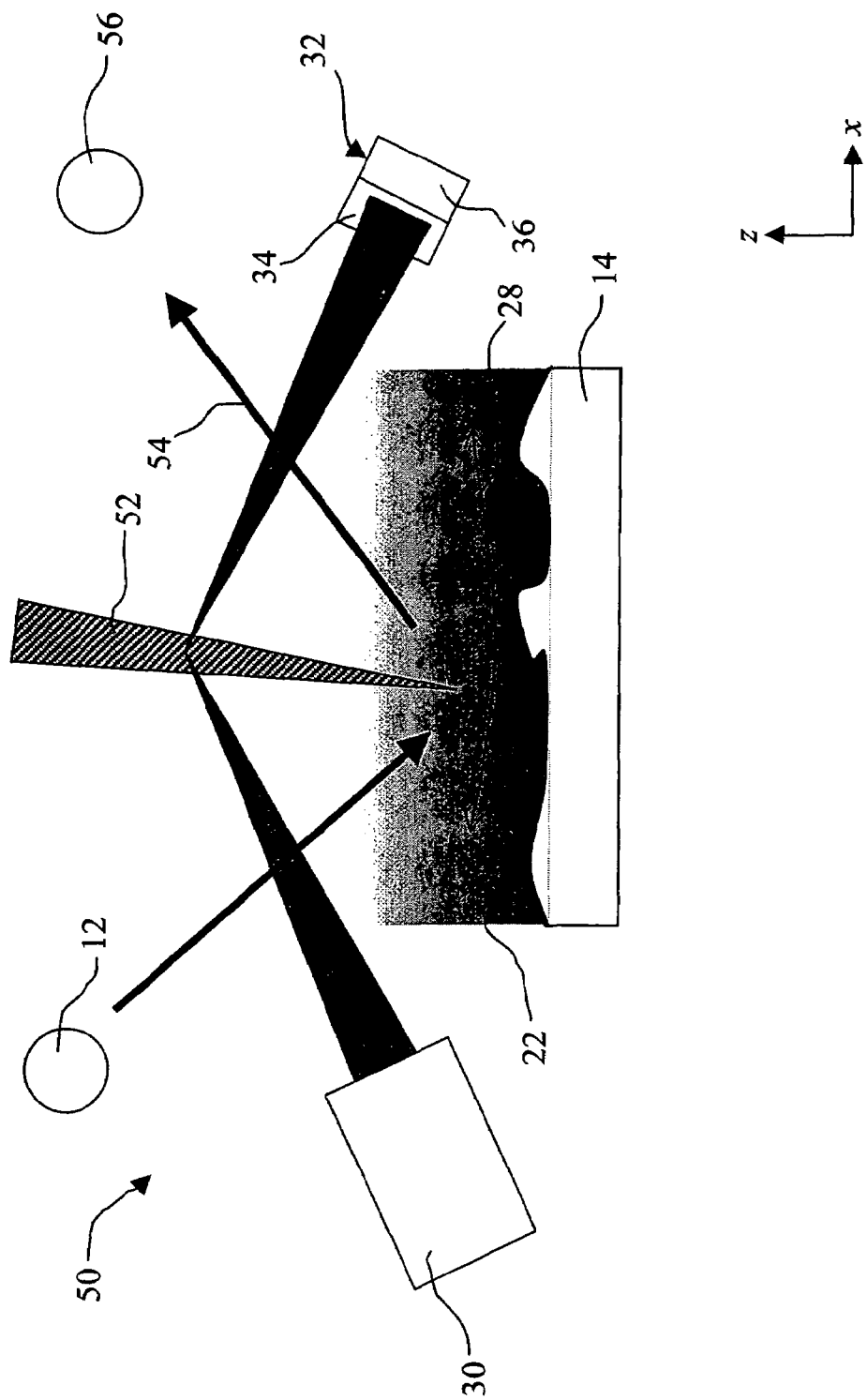
FIG. 3 shows a schematic implementation of the invention in an apertureless scanning near-field optical microscope (apertureless SNOM mode)

FIG. 3 illustrates schematically an embodiment of the invention implemented in an apertureless scanning near-field optical microscope (apertureless SNOM mode), indicated generally by 50. Components providing the same function as those shown in FIG. 1 are like-numbered. In FIG. 3 light from the first laser source 12 illuminates the sample 14 directly. In the near-field region 22 around the sample 14 there will therefore be both evanescent and radiating fields. A tapered tungsten probe 52 is mounted on a scan tube (not shown) substantially normally to the sample surface. The scan tube enables the probe 52 to be moved both in the y and z directions i.e. into the page and towards the sample surface, using the same notation as for FIG. 1. The probe 52 can also be oscillated in a lateral direction, as indicated by the arrows 28, by a piezoelectric transducer (not shown). Scattered light 54, containing information relating to the probe-field-sample interaction is collected by detector 56. As for the FIG. 1 apparatus, probe oscillation is monitored by reflection of a focused light beam from the second laser 30 towards the first 36 and second 38 components of the off-axis split photodiode detector 34.

In operation, the principle of the apertureless SNOM is similar to that of the apparatus 10 of FIG. 1 in which illumination is by evanescent field. When the sample is illuminated the probe 52 is brought into the near-field region 22 and oscillated in the xz plane close to resonance. Two scan lines are therefore obtained in one period of this oscillation and the scan tube controls motion in the y direction to complete the scan over the sample surface. At the same time, the probe oscillation amplitude is monitored by the second laser 30 and split photodetector 32 system. A processing circuit extracts the required amplitude information from the photodetector signal and in turn feeds this information back to the scan tube which also controls probe movement in the z direction. The scan tube z direction movement is made so as to maintain constant shear force and therefore constant oscillation amplitude. The main difference between this mode and PSTM is how the sample-field-probe interaction is excited and measured. In the arrangement of FIG. 3, the absence of total internal reflection means that the sample is illuminated directly by a radiating field. This gives rise to both radiating and evanescent fields in the near-field region 22. As the probe 52 is brought into the near field both evanescent and radiating field-probe interactions are coupled to some degree into the radiating field, which is detected in the far field by detector 56. The detected signal is amplified and processed to form an image. The image formed in this way may be processed in substantially the same way as that obtained using the FIG. 1 apparatus. The difference will be in its interpretation.

Each of the various SNOM modes have their particular advantages and disadvantages and it will depend on the desired application which one is selected. However any of the commonly-used local probes are robust to high oscillation rates and so this invention can be implemented in all SNOM types, as required.

The PSTM technique is the only SNOM arrangement which, to date, has been implemented using monitoring of the photon current to control the probe tip position. This obviates the need to create an interaction force (such as the shear force, which is fortunately a relatively weak force) between sample and probe which can be destructive of delicate polymer and biological specimens. The shear force method of distance control, as described in relation to the embodiments of FIGS. 1 and 3, operates through a confined fluid layer (water in standard conditions) between sample and probe. Interaction forces in this environment are extremely complex and they depend both on probe-sample separation and the material nature of the sample itself. This complicates image interpretation as material changes are indistinguishable from topological changes.

One limitation of PSTM (and of the arrangement shown in FIG. 1) is that images must be viewed in transmission: that is, samples must be transparent. Another is that the necessary oblique illumination introduces a strong anisotropy in the case of a sample with topography variations of several hundred nanometers Furthermore, although advantageous in some respects, illumination with polarised light may not always be desirable and the PSTM technique is not amenable to unpolarised illumination.

The advantage of the apertureless SNOM mode is that the probe need not be an optical fibre. In fact it need not be transparent at all. Tungsten is a preferred material as tungsten fabrication is a mature technology and extremely small apices are achievable. Furthermore, a tungsten tip has a relatively high scattering cross section and the material itself has a high elastic modulus leading to a high probe resonant frequency. It is also clear that the probe can interrogate equally effectively either the transmitted or reflected field and so sample transparency is not an issue.

Figure 4:
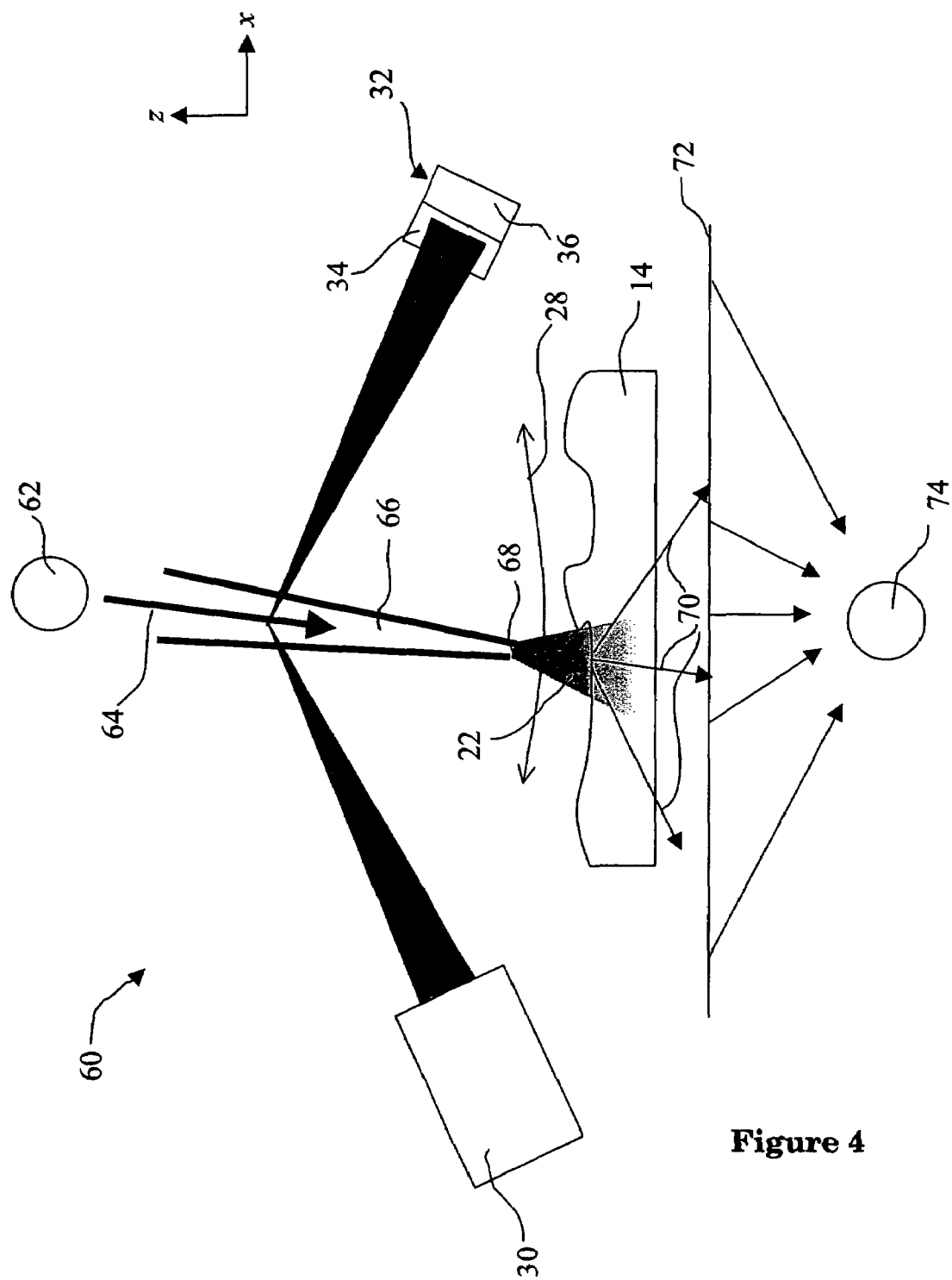
FIG. 4 is a schematic illustration of the invention implemented in an apertured illumination SNOM mode.

FIG. 4 is a schematic illustration of the invention implemented in an apertured illumination SNOM mode. The apparatus 60 implementing this embodiment of the invention has a light source 62, radiation 64 from which is arranged to propagate down an optical fibre (not shown) to a probe 66 with sub-wavelength aperture 68. After interacting with the sample 14 scattered light 70 is collected in the far field by a lens 72 and focused Onto a photodetector 74. Again either the probe 66 or sample is mounted on a scan tube which is capable of scanning in the y (continuous scan) and z (height adjustment) directions, and connected to a piezoelectric transducer which is capable of driving probe oscillations substantially in the x direction, as indicated by the, arrows 28. As in previous embodiments, the laser 30 and split photodetector 32 are arranged to monitor amplitude of the probe oscillations The process of carrying out the scan is as before: the probe 66 is oscillated near resonance, collecting two scan lines in each oscillation period, and translated relative to the sample in the near-field region above the sample surface 14. Height adjustment is controlled via feedback from the split detector signal and set to maintain sample surface-probe separation substantially constant.

In this embodiment 60 however, the sample is illuminated via the sub-wavelength aperture 68, which is scanned across its surface. Due to the sub-wavelength dimensions of the aperture 68, radiation cannot propagate from the fibre to the sample and the sample is illuminated only by an evanescent field. This field interacts with the sample and the effect of the sample is coupled into both evanescent and radiating fields. The radiating field is collected by the lens 72 and detector 74. Data processing and image formation are carried out after collection.

The detector 74 can be any one of a number of commonly-used optical detectors: for example, an avalanche photodiode, channel photomultiplier or standard photomultiplier tube. The probe 66 for use in apertured illumination mode is not so flexible as those used in apertureless and PS. TM modes. It must be an optical fibre in order to be able to illuminate the sample and the aperture is formed by coating the fibre with an optically opaque substance. In this embodiment, the fibre is coated with aluminium. Aluminium is a preferred material as it has a small skin depth for optical-frequency electric fields and so a small aperture can be defined. Other metals may also be used however.

Images collected using apertured illumination SNOM are easier to analyse than those collected using other techniques. There are fewer problems with stray light and maintaining illumination at constant distance from the surface helps remove topographical artefacts. SNOM image analysis may be carried out using finite-difference time-domain computer simulation of Maxwell's equations, as described by S. H. Simpson and S. Hanna in Opt. Co mms. 196(1-6): 17-31 Sept. 2001. Apertured illumination SNOM is also capable of imaging birefringence, which is of particular importance in studying crystallisation processes, and may prove useful for digital data storage.

On the other hand SNOMs using metallised fibres are more limited by noise than the other local probe microscopes. The laser damage threshold of the metal coating is a factor which limits the improvement which can be made to the signal to noise ratio simply by using a more powerful laser to illuminate the sample. Intensities above about 5 mW result in partial vaporisation of aluminium coating. Due to signal noise, resolution is expected to degrade significantly, in comparison to PSTM and other apertureless modes, below about 50 nm.

Figure 5:
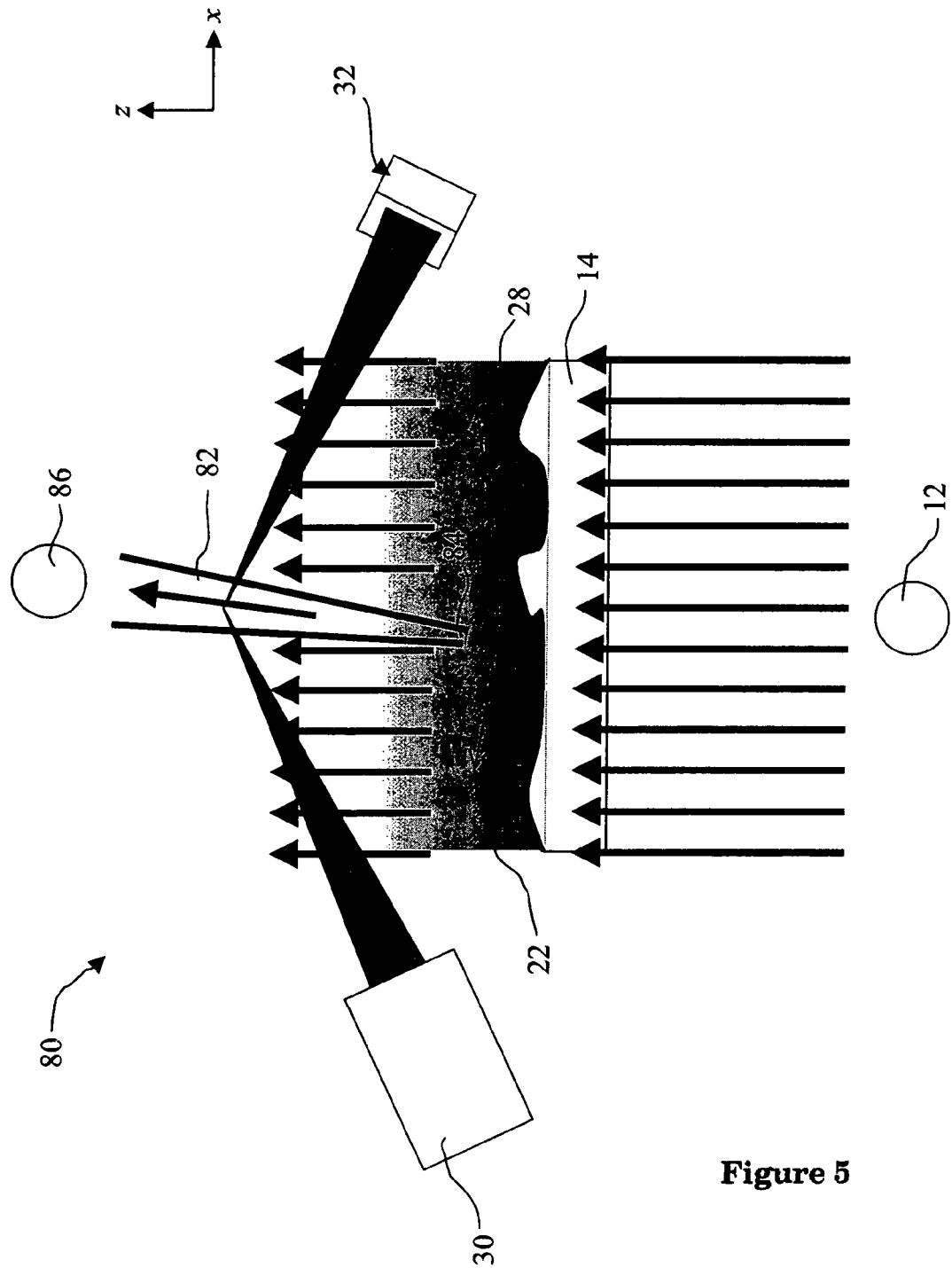
FIG. 5 is a schematic illustration of an implementation of the invention in a first apertured collection SNOM mode.
Figure 6:
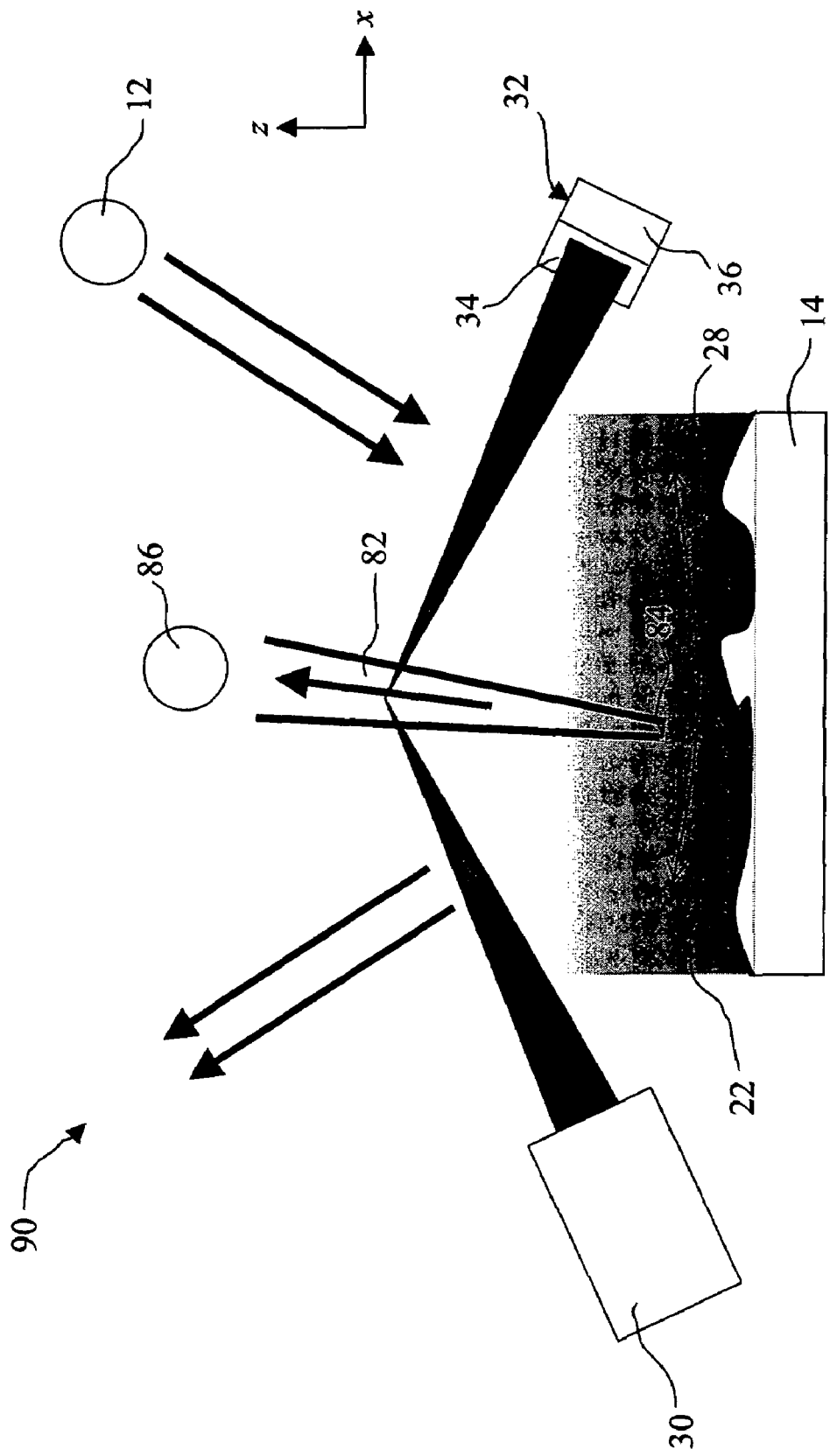
FIG. 6 is a schematic illustration of an implementation of the invention in a second apertured collection SNOM mode.

FIGS. 5 and 6 illustrate schematically apparatus 80, 90 embodying the invention in apertured collection SNOM modes. Light from the source 12 is incident on the sample 14 from the far field. Interaction with the sample 14 results in both evanescent and radiating fields in the near-field region 22. This region is scanned by an apertured probe 82, the scanning being achieved and monitored in the same way as for previous embodiments of the invention. The apertured probe 82 in this embodiment is an aluminium-coated tapered optical fibre whose tip is left free of coating to form an aperture 84. This probe functions as a nanocollector: that is, its sub-wavelength tip interacts with the fields in the near-field region 22 around the sample, the interactions coupling into a radiating field which propagates along the fibre the other side of the aperture 84. This propagating field is detected by a detector 86 and the detector signal is processed to form an image. The difference between the two arrangements 80, 90 is that in FIG. 5 the SNOM 80 is arranged to view the image in transmission and in FIG. 6 in reflection. That is, the sources 86 are on differing sides of the sample, the FIG. 6 arrangement 90 being suitable for imaging opaque materials.

Figure 7:
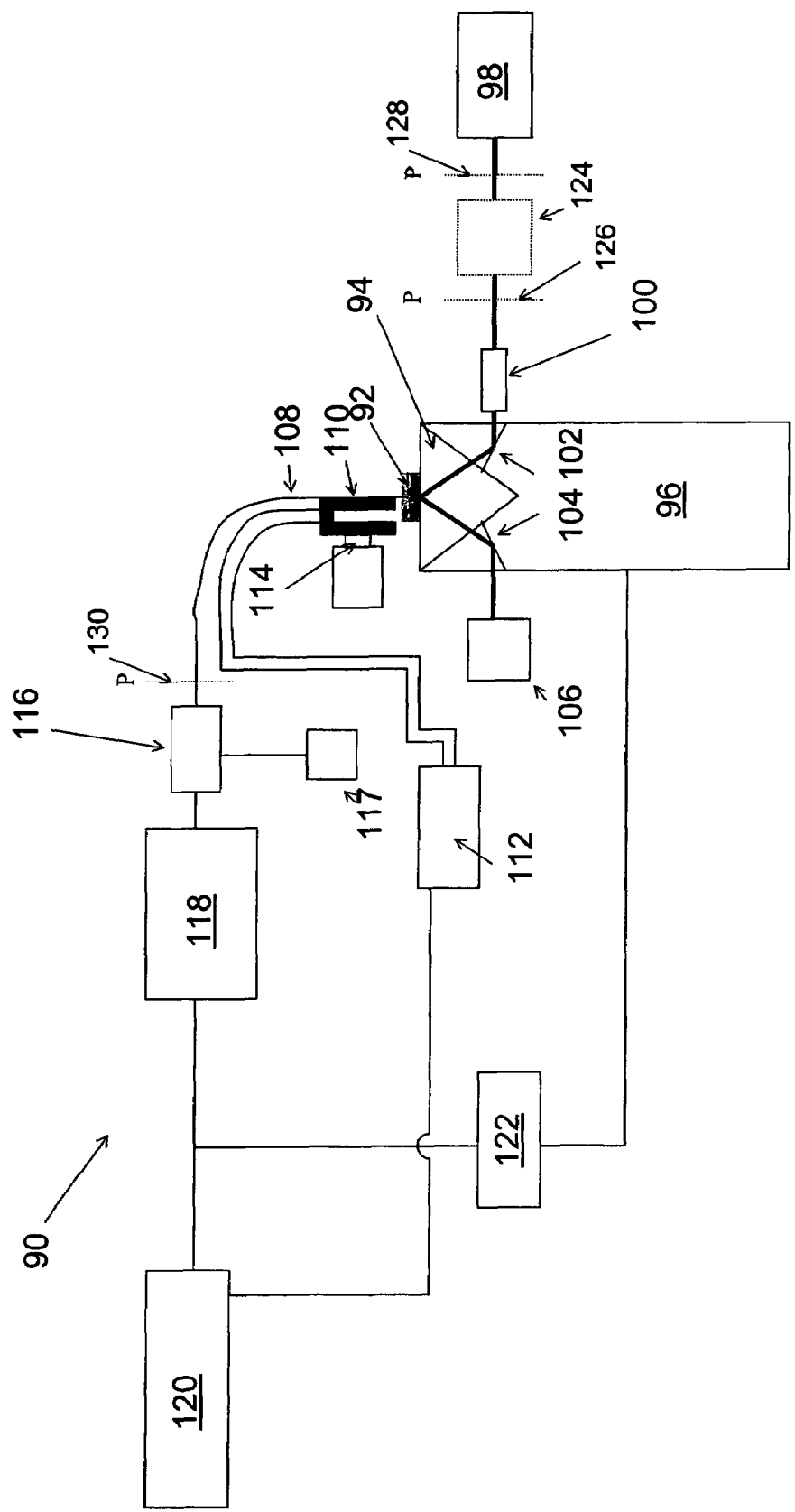
FIG. 7 shows a schematic illustration of a practical microscope system for implementing the invention in a PSTM mode of operation.

FIG. 7 illustrates an embodiment 90 of this invention that employs the full PSTM mode of operation: evanescent illumination and height control by monitoring the photocurrent. The principles of operation of this SNOM mode are similar to those described in relation to the system 10 of FIG. 1, except that the second laser 30 and split photodiode detector 32 are not used to monitor probe oscillation.

In order to obtain evanescent illumination a sample 92 is mounted on a first face of a right angled prism 94 which is scannable in a z direction by means of a scan tube 96. Light from a laser source 98 is directed, by means of focusing optics 100 and a mirror system 102, through a second face of the prism 94 to incidence on the first face at the position of the sample 92. The angle of incidence is such that the light is totally internally reflected at the position of the sample. The sample 92 is therefore illuminated in an evanescent field. The light (propagating field), having been reflected, then exits the prism and is directed by means of a second mirror system 104, to a beam dump 106. An etched optical fibre 108 forms the probe. The sample 92 is moveable by means of the scan tube 96 which enables the probe 108 to be brought into its near-field region and probe-sample separation to be adjusted. The probe 108 is attached to one side of a tuning fork 110 which is driven by a sinusoidal voltage supplied from its control 112. A small piezoelectric transducer 114 is connected to the probe 108 in order to provide a scan in the y direction (slow scan axis), perpendicular to the direction (fast scan axis) in which it may be oscillated by the tuning fork 110.

In performing a scan, any propagating signal generated by the probe-sample-evanescent field interaction will travel along the fibre 108 to a channel photomultiplier (CPM) 116. Such detectors 116 have a fast response time (approximately 1 ns), which is clearly desirable during a fast image scan. A high voltage amplifier 117 controls the gain of the CPM 116. The beam dump 106 serves to prevent stray propagating light from reaching the CPM detector 116. The CPM output is amplified by a high bandwidth amplifier 118. The amplified signal is then passed to data capture electronics 120 for image processing and analysis and is also fed back to the scan tube 96 via a signal averaging means 122.

In one embodiment of this invention, the amplifier 118 is dc coupled. The signal averaging means 122 in this embodiment is a low pass filter which removes all intensity variations from the signal which occur over timescales less than the period of oscillation of the tuning fork 110.

In a second embodiment light from the laser 98 is first passed through a pockel's cell 124 placed between polarisers 126, 128 before being incident on the prism 94. This provides a means of oscillating laser output intensity. The amplifier 118, in this embodiment, is ac coupled and the signal averaging means 122 is a lock-in amplifier set to the oscillation frequency of the pockel's cell 124.

The data capture electronics 120 is connected to the tuning fork control 112 and so is also able to monitor the motion of the tuning fork 110. A third polariser 130 may optionally be placed in the output signal light path before the GPM 116.

The principles of operation of the system 90 of FIG. 7 are substantially as described in relation to FIG. 1. The sample is illuminated in an evanescent field as a result of the total internal reflection of light within the prism 94. The sample 92 is raised (in the z direction) by means of the scan tube 96 until the probe 108 is brought into the evanescent field. The tuning fork 110 is then driven at resonance in order to oscillate the probe 108 in the xz plane. At the same time the piezo 114 moves the probe 108 continually in the y direction. In this way relative motion of the probe and sample enables the probe to perform a fast zigzag raster scan of the sample surface. As a result of the probe-field-sample interaction, a radiating field is produced which propagates along the fibre to the CPM 116. Thereafter the signal is amplified and processed in order to extract the required image.

When the probe 108 is brought into the near-field zone, its height above the sample 92 is adjusted until the desired signal intensity is reached and the scan is started. The CPM 116 is arranged to detect continuously signal intensity within the probe fibre 108. The CPM output signal is amplified and passed to the data capture electronics 120 for image processing and to the signal averaging means 122 for averaging. The averaged intensity signal is fed back to the scan tube controller over a number of oscillation cycles of the probe 108. If at any point in the scan a reduced average intensity (again over a number of cycles) is observed in this feedback loop, this indicates a smaller photocurrent from which it is concluded that the probe-surface separation has been increased. The scan tube controller therefore responds to the lowered signal level in the feedback loop and drives the scan tube 96 in a direction to reverse the decrease i.e. the sample 92 is moved towards the probe 108 (in the z direction) Conversely a larger intensity indicates a decrease in probe-surface separation and the sample 92 should be raised. This feedback is therefore used to maintain the set average intensity (the photocurrent) and so to ensure that the average probe-surface separation over the course of a scan is kept approximately constant.

In the first embodiment of this system, referred to above, the amplifier 118 is a dc amplifier and signal averaging means 122 is a low pass filter. In this embodiment therefore, at the same time as the output signal from the dc amplifier 118 is passed to the data capture electronics 120 for analysis it is also passed through the low pass filter 122. The filter 122 removes all intensity variations from the signal which occur over timescales less than the period of oscillation of the tuning fork 110. This filtered signal therefore corresponds to the average output signal intensity (i.e. average photon current) and it is fed back to the scan tube 96. If this average intensity varies, then the scan tube 96 adjusts the sample height to maintain constant separation from the probe.

In the second embodiment of this system, the amplifier 118 is an ac amplifier, signal averaging means 122 is a lock-in amplifier and the pockel's cell 124 and arrangement of polarisers 126, 128 are also used. The problem with the dc amplifier used in the first embodiment is that it has a maximum bandwidth of the order 1 MHz. Clearly it is necessary to use a very high bandwidth amplifier 118 in order to amplify the weak signal output from the CPM 116. To obtain higher bandwidths therefore, an ac coupled amplifier is required. The problem with using an ac amplifier 118 however is that the average optical intensity, which is used to control probe-sample separation is a dc signal. To overcome this, the pockel's cell 124 and pair of polarisers 126, 128 are used to provide a signal with an ac average intensity.

The pockel's cell 124 rotates the plane of polarisation of light passing through it, the degree of rotation depending on the magnitude of an applied electric field. By placing the cell 124 between the polarisers 126, 128 and continually varying (by means of the electric field) the degree of rotation, the intensity of light passing through the system can be varied. In this system 90, the intensity variation is set at around 10 kHz.

As in the first embodiment the amplified image signal is fed to the data capture electronics 120 for processing and analysis and also back to the scan tube 96 in a feedback loop. The lock-in amplifier 122 in this embodiment is set to the frequency of the pockel's cell 124. The output from the lock-in amplifier 122 therefore corresponds to the data signal variation at the frequency that the Pockel's cell 124 is driven i.e. an indication of average output intensity. If this average intensity varies, then the scan tube 96 adjusts the sample height to maintain constant separation from the probe.

Use of the photon current to control the probe tip position has a number of advantages over the shear force technique. First, there is no need to create an interaction force (the shear force) between sample and probe which can be destructive of delicate polymer and biological specimens. In the extreme, a probe controlled by shear force, has a greater tendency to actually hit the surface. This is particularly significant at large oscillation amplitudes, which are clearly desirable in order to increase the scan width, when, there may not be sufficient damping by the shear force before the probe and surface collide i.e. the photon current technique offers greater sensitivity. Secondly, the range of probe-sample separations accessible using photon current control is increased. In using, shear force the probe must be within at least 10 nm and usually 1 or 2 nm before it starts to experience the interaction. If the surface is rougher than this then, again, collisions become likely. This is particularly the case if the surface has sharp high points. By way of contrast the PSTM signal decays over distances of approximately the wavelength of light used. The probe-sample separation can accordingly be controlled within this region, with particular benefit for rough surfaces. Removing the tight control on roughness imposed by the shear force also enables larger areas to be imaged. Thirdly, because photon current is the result of an optical interaction, its response time is essentially instantaneous. The probe in a shear force method inevitably takes a finite time to respond to a change in interaction force (settle time). If the gain in the feedback loop is set too high for the settle time, the shear force probe is unable to respond. Higher feedback gains are therefore permitted when height is controlled by photon current which in turn allows even rough surfaces to be scanned at high speed. Finally, the shear force method of distance control operates through a confined fluid layer (water in standard conditions) between sample and probe. Interaction forces in this environment are extremely complex and they depend both on probe-sample separation and the material nature of the sample itself. This complicates image interpretation as material changes are indistinguishable from topological changes.

It is important that the time constant for the feedback loop, which must be longer than the period of the probe oscillation, is shorter than the time taken to complete the entire scan. Otherwise the probe would not have time to adjust if there; is much change in probe-sample separation.

With reference again to FIG. 7, the components of the system, and potential improvements, will now be described in more detail.

The probe 108 itself is an optical fibre which is sharpened to a tip by etching in HF Since illumination is by evanescent field only, the probe need not have a sub-wavelength aperture and can therefore be uncoated. This means that a high power laser can be used for illumination. This results in an increased signal to noise ratio in the collected data which in turn leads to an increase in maximum speed with which a scan may be conducted. Apertured SNOM probes are generally metal coated, often with aluminium. Intensities above about 5 mW result in partial vaporisation of aluminium coating and so limit the quality of data which (can be obtained by improving signal to noise.

The laser 98 is a DPSS 50 mW Nd:YAG from Coherent which outputs a wavelength of 532 nm. There are minor problems with the long laser coherence length, which leads to the formation of interference fringes from propagating light scattered by dust on the sample surface. Presently the laser beam is heavily focused (i.e. number of scattering points is reduced) in order to minimise the effect but in future it is envisaged that a bright LED or low coherence laser diode may be used.

A number of tuning forks 110 are available which oscillate at different frequencies. In the set up 90 of FIG. 7 the tuning fork 110 is of quartz crystal with resonant frequency of 32 kHz. It thus acts as a resonator to allow stable fast motion of the probe 108 over the sample surface. In future a 100 kHz tuning fork may be used to permit an even faster scan. The tuning fork control 112 supplies a sinusoidal voltage to drive the tuning fork 110 and monitors its motion via changes in impedance. An alternative to the tuning fork may be provided by a piezoelectric bimorph. This potentially will permit greater flexibility in controlling the resonant frequency and hence scan parameters.

The use of the tuning fork 110 also enables the system 90 of FIG. 7 to be used to collect conventional SNOM images. Since the probe 108 is attached to the side of the tuning fork 110, interactions (in particular the shear force interaction) between the probe 108 and the sample surface will alter the resonant properties of the tuning fork system. It can thus be used to control probe height by use of the shear force method as a conventional SNOM scan is performed. By adapting the system 90 to be able to perform both a conventional scan and one in accordance with this invention, a comparison between the two techniques can readily be made.

The piezoelectric transducer 114 is preferred to a second scan tube to drive the probe 108 in its slow scan direction, despite its more limited range (only a few μm). It is however capable of being driven at far higher frequencies before becoming unstable. This, significantly, allows still faster scanning.

Using total internal reflection to generate the evanescent field necessarily results in the sample 92 being illuminated in a polarised beam. Accordingly if the third polariser 130 is placed before the CPM 116 in a cross polar orientation with respect to the illuminating field, information relating to the birefringence of the sample can be collected. Imaging birefringence is of particular importance in studying crystallisation processes and may prove useful for digital data storage.

The output signal fed to the capture electronics 120 can be processed and analysed in any of a number of ways. The method chosen will depend to some extent on the type of image it is required to extract, although two methods suitable for implementation with the system 90 shown in FIG. 7 will now be described. The output signal from the amplifier 118 is recorded by the electronics 120 simultaneously with the motion data from the tuning fork 110. A 20 MHz 8 bit National Instruments ADC card is used for this purpose. The signal is digitised in the time domain; that is, each pixel of the image is equally spaced in time from its neighbours. Since the speed of the, probe tip varies during an oscillation cycle, the data is post-processed to correct for this. Any time difference between the data and the motion of the tuning fork 110 (the fast line sync signal) is corrected by eye, manually. When multiple images are collected a frame synchronisation signal is recorded alongside the other data channels to allow each image to be separated. An improvement to this system, which is capable of real-time data processing uses an FPGA situated on the same card as the ADC which records at 100 MHz 12 bit. The time difference between the data and the motion of the tuning fork is corrected automatically using an autocorrelation algorithm based on the symmetry between the trace and retrace parts of the oscillation cycle. To achieve these high data rates the recorded data is first stored in an on-board memory module located with the FPGA and ADC electronics before it is moved more slowly to a longer-term storage facility such as a PC memory or hard disk.

Although this embodiment of the invention includes a piezoelectric transducer 114 which provides a linear motion in the y direction, clearly, as with other embodiments, many other scan geometries can be used. The only requirement, when imaging an area, is that the combination of sample (or, equivalently probe) translation and probe oscillation covers the area to be imaged.

FIG. 8a shows a topographical image 140 of a polymer spherulite of poly(hydroxybutyrate-co-valerate) (PHB/V) collected using the system 90 almost as shown in FIG. 7 but operated in a conventional manner. That is by step-scanning the probe across the sample surface and by maintaining constant probe-sample separation using the shear force method. For assessment purposes a large scan tube capable of collecting 100 μm images was used in place of the piezoelectric transducer 114. In the conventional scan, this scan tube drove both x and y translations.

FIG. 8b shows an optical image 142 of the same polymer spherulite collected simultaneously with the image 140 shown in FIG. 8a. A polariser (P) and analyser (A) were placed in the optical system respectively before and after the sample 92. Their orientations were as marked 144. This birefringent image 142 shows banding (indicated by arrows 146) that corresponds to changes in the birefririgent properties of the sample arising from rotation of the lamellae that form the structure of the spherulite.

Images 140, 142 of FIGS. 8a and 8b were collected over a period of about 20 minutes, the image acquisition rate being limited by the response time of the shear force measurement and not the signal to noise ratio of the optical system. A boxed area 148 indicated on FIG. 3b was scanned immediately after these images 140, 142 were taken. This time the scan was made using the system 90 of FIG. 7 operating in high speed mode, in accordance with this invention.

FIG. 8c shows an image 150 of the boxed area 148 of FIG. 3 taken using the high-speed scanning arrangement of FIG. 7. Again the scan tube referred to above replaced the piezoelectric transducer 114 in order to drive the slow scan (y direction). This image 150 was collected in 250 ms, i.e. almost 5000 times as rapidly as that shown in FIGS. 8a and 8b. All the same features are visible as appear in FIG. 8b, including a dislocation of one of the optical bands. Unlike conventional SNOM scans, the line rate is sufficiently high to offer the potential for averaging consecutive scan lines in order to reduce image noise. In fact, the line rate is so much higher in comparison with the slow scan translation rate that averaging becomes necessary. If no averaging is performed then information is actually lost during viewing due to the excessive number of lines.

FIG. 8d shows an image 152 taken of the same area covered by the image 150 of FIG. 8c. This image 152 was collected in only 50 ms. The left hand side is poorly defined due to an excitation of a resonance of the scan system when the scan tube changed direction. This effect decays with time as the remainder of the image is collected.

It is noted that a similar degradation of image is observed when using the system to collect conventional SNOM images at a high scan rate but appearing on the fast scan axis as opposed to the slow one. This is to be expected as the same actuator methods (the scan tube) are used in both instances. This mechanical instability limits the maximum achievable image acquisition rate using this particular assessment apparatus. Theoretically the optical signal to noise ratio would enable a frame rate of greater than 100 frames per second to be achieved This is equivalent to collecting the entire image is less than 10 ms. The distortion can be overcome by reverting to the piezoelectric transducer 114 for driving along a single scan axis, as described with reference to FIG. 7. Such a piezo 114 is capable of stable millisecond time response, unlike the large, low resonance frequency scan tube. This is why the piezo is preferred.

An alternative to the PSTM technique illustrated in FIG. 7 is to replace the optical fibre probe with a metal probe. The interaction between probe, field and sample will perturb the main, totally internally reflected, beam. It is envisaged therefore that fluctuations in the intensity of this main beam can be detected, for example by using an interference technique. This configuration of PSTM will have the advantage that sharper probes can be used because of the increased scattering cross section of metals.

An important application for the fast scanning SNOM modes of this invention is to digital data reading. In one current process, high-density data is written using the heated tip of an atomic force microscope (AFM) probe to burn pits of around 10 nm in a storage medium, The data may be readout by carrying out a differential temperature scan of the surface The pits however present topographic variations, ideal for readout using this invention implemented in one of the SNOM modes described herein. It is noted however that, because of their inherently higher resolution one of the apertureless modes may be preferred.

Currently, many different ways of achieving high-density data storage are being explored. Many, for example polymer reconformation and magnetic domain storage, are suitable for rapid readout by one of the modes of SNOM described herein.

Other applications of this invention include the detection and measurement of guided waves, polaritons, microcavity modes and other confined electromagnetic fields as well as in local surface spectroscopy.

The invention claimed is:

1. A scanning near-field optical microscope comprising:
   a probe which is moveable into a near-field region surrounding a surface of an illuminated sample;
   driving means arranged to provide relative motion between the probe and the sample surface;
   means for oscillating the probe laterally across the surface; and
   a detector arranged to detect electromagnetic radiation affected by an interaction between the probe, an electromagnetic field, and the sample in the near-field region;
   the microscope is arranged, in operation, to carry out a scan of the sample surface wherein scan area is covered by an arrangement of scan lines, each scan line including a plurality of pixels and being collected by oscillating the probe laterally at or near its resonant frequency such that an oscillation amplitude corresponds to a scan line length and the arrangement of scan lines is provided by operation of the driving means;
   the relative motion between the probe and the sample surface is provided at an adjustable separation distance, this distance during the scan being controlled by height-adjustment means arranged to monitor a parameter characteristic of probe-surface distance and to adjust either probe or sample height in order to maintain a substantially constant value of that parameter; and
   the electromagnetic field is a substantially evanescent field and the parameter characteristic of probe-surface distance is a photon current.

2. A scanning near-field optical microscope comprising:
   a probe which is moveable into a near-field region surrounding a surface of an illuminated sample;
   driving means arranged to provide relative motion between the probe and the sample surface;
   means for oscillating the probe laterally across the surface; and
   a detector arranged to detect electromagnetic radiation affected by an interaction between the probe, an electromagnetic field, and the sample in the near-field region;
   the microscope is arranged, in operation, to carry out a scan of the sample surface wherein scan area is covered by an arrangement of scan lines, each scan line including a plurality of pixels and being collected by oscillating the probe laterally at or near its resonant frequency such that an oscillation amplitude corresponds to a scan line length and the arrangement of scan lines is provided by operation of the driving means;
   the microscope is associated with a light source for illuminating the sample; and
   the electromagnetic field is a substantially evanescent field.

3. A microscope according to claim 2 characterized in that, the sample is mounted on a prism and the prism and light source are mutually arranged such that, in-operation, light from the source is totally internally reflected inside the prism at a region adjacent the sample and thereby illuminates the sample in the evanescent field;
   the probe is a tapered optical fibre with a sub-wavelength tip such that, on interaction of the tip with the evanescent field around the sample, radiating waves are generated in the fibre, remote from the tip;
   the detector is arranged to detect radiating waves propagating in the fibre; and
   the microscope also includes image signal processing means arranged to extract and display an image of the sample from a signal received at the detector 4. A microscope according to claim 2 characterised in that, the probe is an apertured optical fibre arranged such that light from the source can propagate along the fibre and couple with a sub-wavelength aperture at the fibre tip to illuminate the sample in the evanescent field;
   the microscope also includes collecting optics arranged to collect radiation scattered from the sample and focus it on the detector; and p1 the microscope also includes image signal processing means arranged to extract and display an image of the sample from a signal received at the detector.

5. A microscope according to claim 4 characterised in that the probe is a tapered optical fibre coated, except for its tip, with aluminium, the tip thereby forming the aperture.

6. A photon scanning tunnelling microscope comprising:
a prism for supporting a sample on its top surface;
guiding optics for directing light from an associated light source into the prism and to internal incidence on its top surface at an angle sufficient to provide for total internal reflection and thereby to provide for illumination of the sample in an evanescent field;
an exit path for removing reflected light from the prism;
driving means arranged to provide relative motion between the sample and a probe; and
means for oscillating the probe across the sample surface; wherein the microscope is arranged, in operation, to hold the probe within the evanescent field surrounding the illuminated sample and to scan the probe across the sample surface such that the scan area is covered by an arrangement of scan lines, each scan line being collected by oscillating the probe at or near its resonant frequency such that an oscillation amplitude corresponds to a scan line length and the arrangement of scan lines is provided by operation of the driving means; and wherein the microscope further comprises:
detection means arranged to detect electromagnetic radiation affected by an interaction between the probe, a field and the sample and to provide an output signal indicative of this interaction;
processing means for processing and analysing the signal output from the detection means and for providing a display illustrative thereof; and
signal averaging means arranged to average the signal output from the detection means and to pass the averaged signal to the driving means, the driving means being further arranged to be responsive to fluctuations in the averaged signal and to adjust, as the probe is scanned, probe-sample separation in order to maintain a substantially constant value of the averaged signal and hence of average detected photocurrent.

7. A microscope according to claim 6 wherein the detection means is arranged to detect light within the exit path.

8. A microscope according to claim 6 wherein the probe is a tapered optical fibre, the interaction between the probe, the field and the sample results in radiating waves being generated within the fibre and the detection means is arranged to detect light propagating within the fibre.

9. A microscope according to claim 8 wherein the microscope includes an amplifier arranged to amplify the output signal from the detection means before passing it to the processing means and signal averaging means which accordingly process and average an amplified output signal.

10. A microscope according to claim 9 wherein the amplifier is a dc coupled amplifier and the averaging means is a low pass filter.

11. A microscope according to claim 9 wherein a modulating means is located in a light path between the associated light source and the prism, the modulating means being arranged to modulate light from the source so as to generate an intensity modulated light beam with which to illuminate the sample, the amplifier is an ac coupled amplifier and the averaging means is a lock-in amplifier set to the frequency of the modulations of the intensity-modulated beam.

12. A microscope according to claim 11 wherein modulating means comprises a Pocket's cell located between two polarisers, the intensity modulated beam being generated by application of an alternating voltage across the Pocket's cell.

13. A microscope according to claim 6 wherein the driving means comprises a scan tube arranged to adjust the probe-sample separation.

14. A microscope according to claim 13 wherein the scan tube is arranged to move the probe.

15. A microscope according to claim 13 wherein the scan tube is arranged to move the sample.

16. A microscope according to claim 6 wherein the driving means comprises a piezoelectric transducer arranged to provide a relative translation between probe and sample whilst maintaining probe-sample separation.

17. A microscope according to claim 6 wherein the probe is attached to a prong of a tuning fork which is in turn connected to a tuning fork control and probe oscillation is provided by application of an oscillating voltage to the tuning fork by the control.

18. A method of rapidly collecting image data from a scan area of a sample with nanometric features wherein the method comprises the steps of:
(a) illuminating the sample with an evanescent field;
(b) moving an optical fibre probe with tip of sub-wavelength dimensions into the evanescent field around the sample;
(c) oscillating the probe across a surface of the sample at or near its resonant frequency whilst providing a relative motion between the probe and surface such that an arrangement of scan lines, whose length corresponds to oscillation amplitude, covers the scan area;
(d) detecting radiation propagating within the fibre probe, and which therefore contains information relating to interactions between the probe, the evanescent field and the sample, at a detector;
(e) amplifying the output from the detector;
(f) averaging amplified signals from the detector in order to provide feedback to a height adjustment means which is responsive to the magnitude of the averaged amplified signals and so adjusts probe-sample separation accordingly; and
(g) processing amplified signals from the detector in order to extract information relating to the nanometric structure of the sample.

* * * * *